(12) United States Patent
Cionca et al.

(10) Patent No.: US 11,709,227 B2
(45) Date of Patent: Jul. 25, 2023

(54) BEAM DISTRIBUTION ADJUSTMENT FOR A SENSOR

(71) Applicant: Ford Global Technologies, LLC, Dearborn, MI (US)

(72) Inventors: Codrin Cionca, Ann Arbor, MI (US); Juan Enrique Castorena Martinez, Southfield, MI (US); Mostafa Parchami, Dearborn, MI (US); Linjun Zhang, Canton, MI (US); Zhen Zhao, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1149 days.

(21) Appl. No.: 16/372,656

(22) Filed: Apr. 2, 2019

(65) Prior Publication Data

US 2020/0319303 A1    Oct. 8, 2020

(51) Int. Cl.
| | | |
|---|---|---|
| *G01S 7/481* | (2006.01) | |
| *G01S 17/42* | (2006.01) | |
| *G01S 17/93* | (2020.01) | |
| *G01S 17/931* | (2020.01) | |

(52) U.S. Cl.
CPC .............. *G01S 7/481* (2013.01); *G01S 17/42* (2013.01); *G01S 17/931* (2020.01)

(58) Field of Classification Search
CPC ...... G01S 7/481; G01S 17/931; G01S 7/4817; G01S 7/4972; G01S 13/91; G01S 15/88; G01S 17/88

USPC ........................................................ 356/4.01
See application file for complete search history.

(56) References Cited

U.S. PATENT DOCUMENTS

| | | | | |
|---|---|---|---|---|
| 7,440,084 | B2 * | 10/2008 | Kane ................... | G02B 6/4204 356/5.01 |
| 7,724,180 | B2 | 5/2010 | Yonak et al. | |
| 8,072,663 | B2 | 12/2011 | O'Neill et al. | |
| 8,446,571 | B2 | 5/2013 | Fiess et al. | |
| 9,418,558 | B1 * | 8/2016 | Stamenkovich ..... | G01C 21/203 |
| 9,921,299 | B2 | 3/2018 | Kalschuer et al. | |
| 2004/0012710 | A1 * | 1/2004 | Yaji ...................... | G02B 27/646 348/E5.038 |
| 2017/0168146 | A1 | 6/2017 | Boehmke | |
| 2018/0088214 | A1 * | 3/2018 | O'Keeffe .............. | G01S 7/4815 |

FOREIGN PATENT DOCUMENTS

WO     2017200896 A2    11/2017

* cited by examiner

*Primary Examiner* — Daniel L Murphy
(74) *Attorney, Agent, or Firm* — Frank A. MacKenzie; Bejin Bieneman PLC

(57) ABSTRACT

A sensor system is disclosed. The sensor system may comprise a housing; an emitter, carried by the housing, that emits a beam comprising depth-data signals; a beam-distribution adjustment system; and a processor programmed to control the adjustment system by selectively changing an angular distribution of the depth-data signals emitted from the housing.

14 Claims, 10 Drawing Sheets

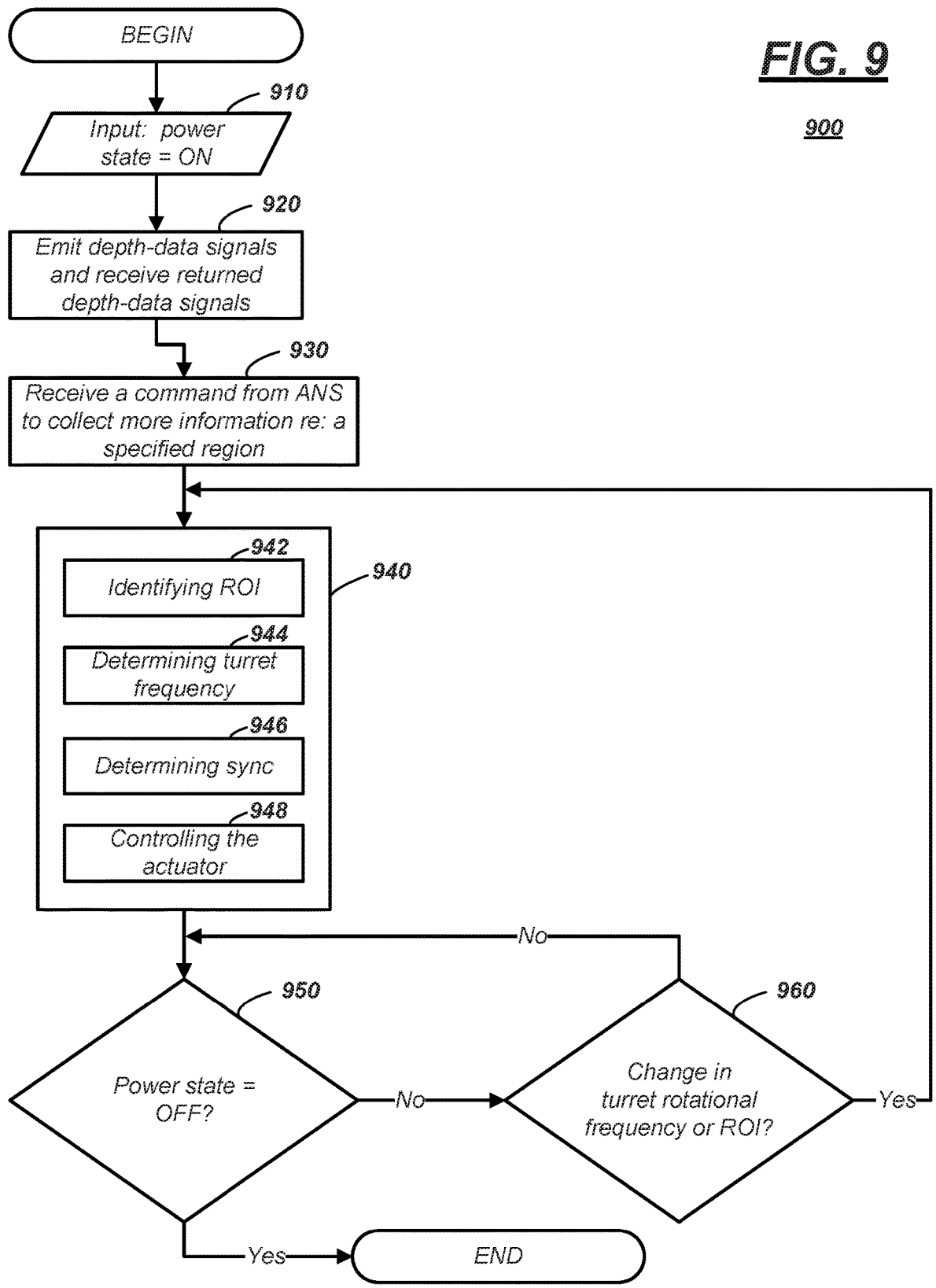

BEAM DISTRIBUTION ADJUSTMENT FOR A SENSOR

BACKGROUND

Active sensing systems conventionally sense an even distribution of information regarding their surroundings.

BRIEF DESCRIPTION OF THE DRAWINGS

FIG. 9 is a flow diagram illustrating a process which may be executed by the depth-data sensor system to move the beam-distribution adjustment system between the nominal and deployed positions.

DETAILED DESCRIPTION

Figure 1:
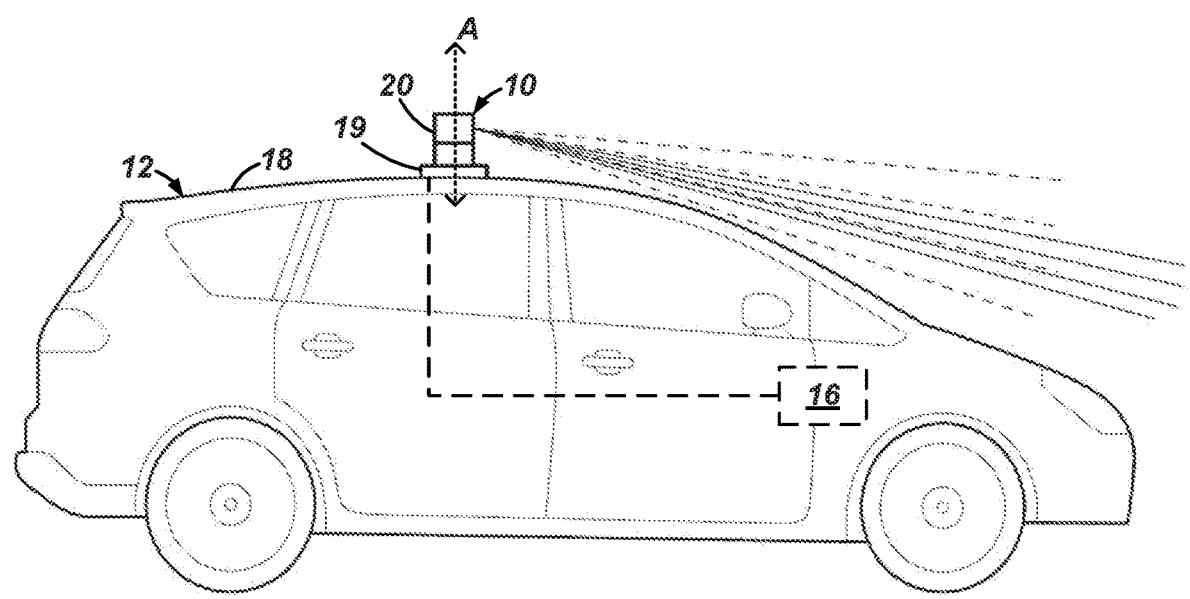
FIG. 1 is a schematic diagram illustrating a vehicle that includes a depth-data sensor system.

A depth-data sensor system is described that comprises: a housing; an emitter, carried by the housing, that emits a beam comprising depth-data signals; a beam-distribution adjustment system; and a processor programmed to control the adjustment system by selectively changing an angular distribution of the depth-data signals emitted from the housing.

According to the at least one example set forth above, the processor selectively moves the adjustment system between a nominal position and at least one deployed position.

According to the at least one example set forth above, the adjustment system comprises a deformable plate, wherein the at least one deployed position is defined by a radius of curvature of the plate.

According to the at least one example set forth above, the sensor is one of a light detection and ranging (LIDAR) sensor, a radio detection and ranging (RADAR) sensor, or a sonar sensor.

According to the at least one example set forth above, the adjustment system comprises a reflective assembly and an actuator.

According to the at least one example set forth above, the reflective assembly comprises a deformable plate positioned in the housing along an optical path of the depth-data signals emitted from the emitter.

According to the at least one example set forth above, the reflective assembly further comprises a coupler coupled to the actuator and a middle region of the plate, a first anchor, and a second anchor, wherein the first and second anchors are coupled to the plate and positioned outboard of the coupler.

According to the at least one example set forth above, when the processor controls the adjustment system from a nominal position to at least one deployed position, the actuator applies a force to the coupler thereby moving the coupler relative to the first and second anchors and thereby changing a shape of the plate to alter the angular distribution of the depth-data signals.

According to the at least one example set forth above, the adjustment system comprises a plurality of reflective assemblies and a plurality of actuators, wherein a different one of the plurality of actuators is coupled to each of the plurality of reflective assemblies, wherein the plurality of reflective assemblies are positioned in the housing along an optical path of the depth-data signals emitted from the emitter.

According to the at least one example set forth above, each of the plurality of reflective assemblies is coupled to the different one of the plurality of actuators via a respective coupler that facilitates independent pivotal motion of the each of the plurality of reflective assemblies relative to the respective different one of the plurality of actuators According to the at least one example set forth above, when the processor controls the adjustment system from a nominal position to at least one deployed position, at least some of the plurality of actuators control a pivotal movement of the corresponding plurality of reflective assemblies.

According to the at least one example set forth above, when the processor controls the adjustment system from the nominal position to the at least one deployed position, it controls the angular distribution of the beam.

According to the at least one example set forth above, when the processor controls the adjustment system from the nominal position to the at least one deployed position, it controls a concentration of the depth-data signals of the beam.

According to the at least one example set forth above, the sensor system further comprises a turret which rotates the sensor system, wherein the processor is programmed to control the actuator to move the reflective assembly between a nominal position and a deployed position at a predetermined frequency.

According to another illustrative example, a system for a vehicle is described that comprises an autonomous navigation system (ANS) and the sensor system, wherein the ANS commands the sensor system to provide more information regarding a region of interest around the vehicle.

According to the at least one example set forth above, the region of interest is a fore side of the vehicle, an aft side of the vehicle, a starboard side of the vehicle, a port side of the vehicle, or a combination thereof.

According to another illustrative example, a method is described. The method may comprise: emitting a beam that comprises depth-data signals from a housing of a sensor system that comprises a beam-distribution adjustment system; and controlling the adjustment system to control an angular distribution of the depth-data signals emitted from the housing.

According to the at least one example set forth above, controlling the adjustment system includes selectively changing the angular distribution of the depth-data signals between a nominal position and at least one deployed position.

According to the at least one example set forth above, controlling the adjustment system includes changing a curvature of a plate of the adjustment system to change the angular distribution of the beam.

According to the at least one example set forth above, the adjustment system comprises a plurality of reflective assemblies, wherein controlling the adjustment system includes steering at least some of the plurality of reflective assemblies.

According to the at least one example, a computer is disclosed that is programmed to execute any combination of the examples set forth above.

According to the at least one example, a computer is disclosed that is programmed to execute any combination of the examples of the method(s) set forth above.

According to the at least one example, a computer program product is disclosed that includes a computer readable medium storing instructions executable by a computer processor, wherein the instructions include any combination of the instruction examples set forth above.

According to the at least one example, a computer program product is disclosed that includes a computer readable medium that stores instructions executable by a computer processor, wherein the instructions include any combination of the examples of the method(s) set forth above.

Figure 2:
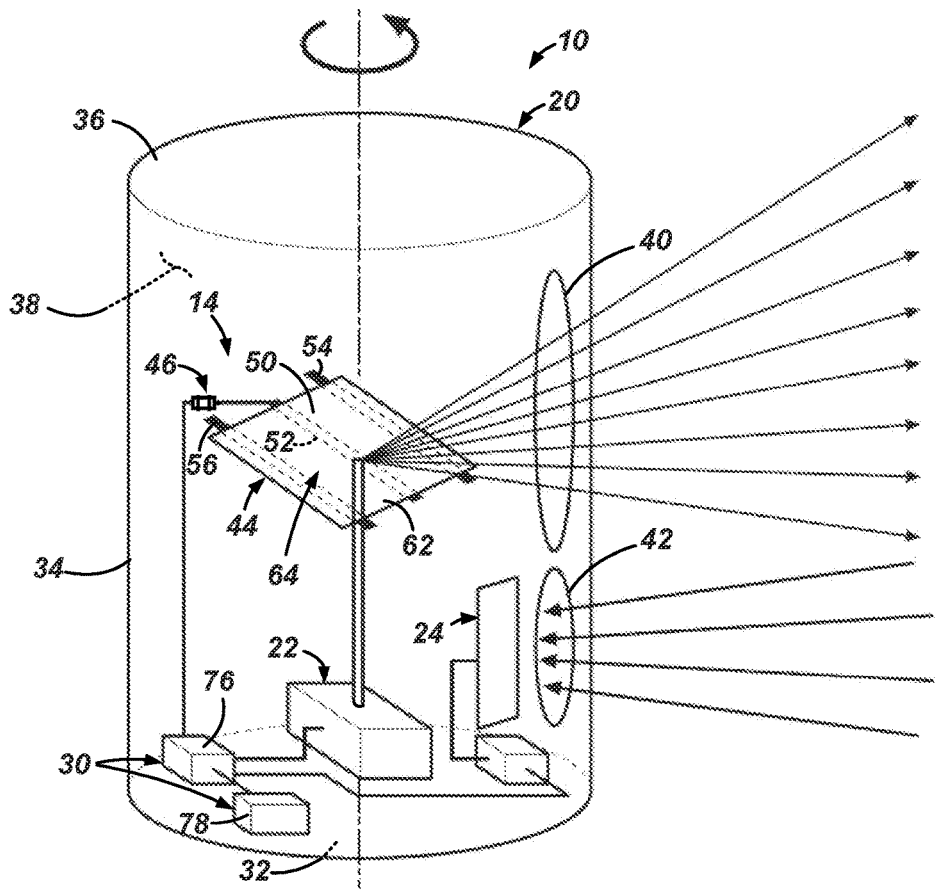
FIG. 2 is a schematic diagram of the depth-data sensor system.

Turning now to the figures wherein like reference numerals indicate like or similar features and/or functions, a depth-data sensor system 10 having an adjustable beam distribution is disclosed (e.g., FIGS. 1-2). As used herein, beam density refers to how many depth-data signals pass through a cross-sectional area of a beam (e.g., the more depth-data signals per square inch, the higher the density of the beam and the fewer depth-data signals per square inch, the lower the density of the beam). As used herein, beam distribution is related to beam density and refers to an angular direction of each of the depth-data signals; e.g., a change in distribution (e.g., or pattern) of the depth-data signals as they leave a sensor may result in a corresponding change in beam density. As used herein, a depth-data signal is a wireless transmission which is emitted from the sensor system 10, wherein, in order to determine depth or distance of an object from the sensor system 10, reflections of the depth-data signal are intended to be received again (and evaluated) at the sensor system 10.

In one implementation, the system 10 is utilized in a vehicle environment (e.g., mounted on a vehicle 12); however, other suitable application environments are contemplated (e.g., mounted on infrastructure or the like). As will be described in greater detail below, depth-data sensor system 10 comprises a beam-distribution adjustment system 14 that permits the sensor system 10 to selectively change an angular distribution of the depth-data signals of the beam and/or change concentration regions thereby collecting more depth data regarding at least one region of interest within its environment (and momentarily less depth data regarding other regions of interest). As used herein, a change in an angular distribution of a beam refers to changing an angular direction of at least one depth-data signal. As used herein, concentration refers to a cluster of depth-data signals that are closer together within a non-uniform beam distribution. Additional detail of the sensor system 10 is described below, including an illustrative operational environment.

Vehicle 12 is illustrated as a passenger vehicle. However, vehicle 12 could be any other suitable vehicle type, including a truck, a sports utility vehicle (SUV), a recreational vehicle, a bus, an aircraft, a drone, a marine vessel, or the like that carries sensor system 10.

In at least one example, vehicle 12 operates in an autonomous mode and includes an autonomous navigation system (ANS) 16. Autonomous navigation system 16 may comprise any suitable computing device(s) which receive information from sensor system 10 (and/or other vehicle sensors) and, based on such sensor information, control movement of vehicle 12. For example, system 16 may include hardware and application-specific code (e.g., software instructions) that control acceleration, braking, and steering of vehicle 12. In at least one example, system 16 is programmed and configured to operate vehicle 12 in one or more autonomous modes—e.g., enabling vehicle 12 to operate with some user assistance (partial autonomy) or without any user assistance (full autonomy). For purposes of this disclosure, predetermined autonomous modes (e.g., defined as levels 0-5), as set forth by the Society of Automotive Engineers (SAE), may be used. For example, according to levels 0-2, a human driver monitors or controls the majority of the driving tasks, often with no help from the vehicle 12. For example, at level 0 ("no automation"), a human driver is responsible for all vehicle operations. At level 1 ("driver assistance"), vehicle 12 sometimes assists with steering, acceleration, or braking, but the driver is still responsible for the vast majority of the vehicle control. At level 2 ("partial automation"), vehicle 12 can control steering, acceleration, and braking under certain circumstances without human interaction. At levels 3-5, vehicle 12 assumes more driving-related tasks. At level 3 ("conditional automation"), vehicle 12 can handle steering, acceleration, and braking under certain circumstances, as well as monitoring of the driving environment. Level 3 may require the driver to intervene occasionally, however. At level 4 ("high automation"), vehicle 12 can handle the same tasks as at level 3 but without relying on the driver to intervene in certain driving modes. And at level 5 ("full automation"), vehicle 12 can handle all tasks without any driver intervention. Thus, using autonomous navigation system 16 (and data collected using sensor system 10), the vehicle may be navigated (entirely or at least partially) without human assistance.

Depth-data sensor system 10 shown fixedly mounted to a roof 18 of vehicle 12 via a turret 19 (which may be part of the sensor system 10 in some examples); however, system 10 may be coupled to vehicle 12 in other ways and/or places as well. In at least one example, being coupled to roof 18 enables sensor system 10 to have a less-obstructed and wide horizontal field of view; however, this is not required. Further, turret 19 may be a slip-ring or other suitable moving mechanism that may enable sensor system 10 to at least partially increase its field of regard (FOR) (i.e., a total region that can be sensed by a movable sensor). In one example, the field of regard of sensor system 10 is 360° (e.g., via rotation about an axis A).

Sensor system 10 may comprise a housing 20, an emitter 22, the beam-distribution adjustment system 14, a receiver 24, and a computer 30. As shown in FIG. 2, the housing 20 may comprise a cylindrical shape, the shape comprising a base 32 which may be coupled to the turret 19, a cylindrical wall 34, and a lid 36. This is merely one example, the housing 20 may have other shapes as well—e.g., having one or more flat walls, one or more curved walls, or a combination thereof. The interior surfaces of base 32, wall 34, and lid 36 collectively may define a cavity 38 that may be sealed from environmental contaminants. In at least one example, wall 34 comprises an emitting window 40 and a receiving window 42. Windows 40, 42 may be comprised of any suitable transparent (or semi-transparent) material and may have one or more layers configured to filter unwanted optical noise from entering the cavity 38.

Emitter 22 may comprise any suitable electronic device for emitting a depth-data signal. In at least one example, the emitter 22 emits electromagnetic radiation (e.g., in the form of visible or non-visible light or radio waves). For example, the system 10 may comprise a light detection and ranging sensor (e.g., LIDAR sensor) or a radio detection and ranging sensor (e.g., millimeter RADAR) or the like. Other examples (e.g., such as sonar) also exist. In at least one example, the emitter 22 emits light for LIDAR operation; the exemplary description which follows uses this implementation by way of example. For example, the windows 40, 42 may have material properties to block predetermined ranges of electromagnetic wavelengths—e.g., thereby behaving as a notch filter (e.g., having a narrow bandwidth with a center frequency that corresponds with the emitted frequency of the depth-data signal).

Figure 3A:
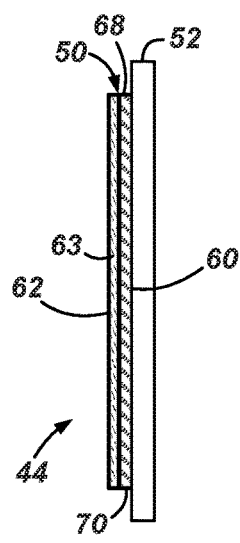
FIG. 3A is a sectional view of a portion of a beam-distribution adjustment system along section lines 3A-3A shown in FIG. 3B.
Figure 3B:
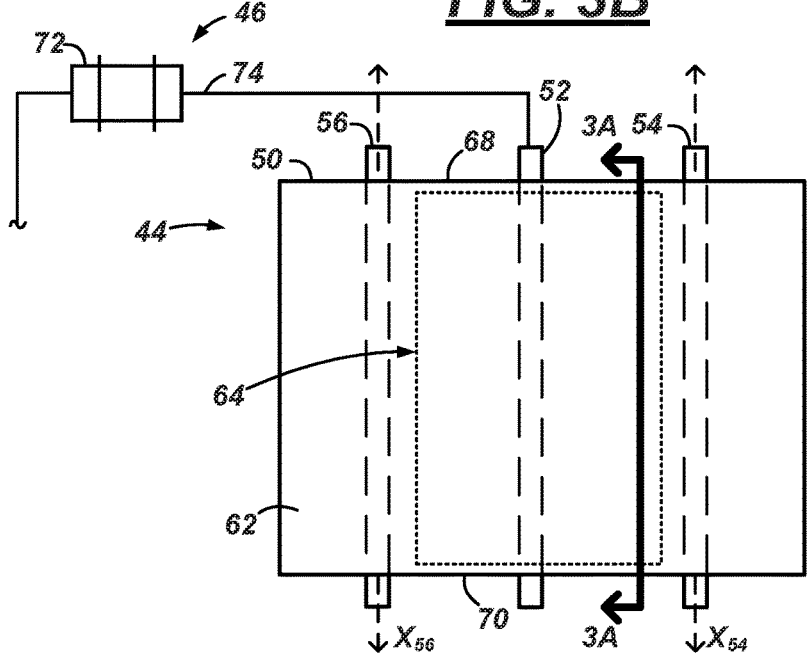
FIG. 3B is a schematic view of the beam-distribution adjustment system.

One example of beam-distribution adjustment system 14 is shown in FIGS. 2, 3A, and 3B; however, as described later, other examples exist. According to the illustrated implementation, adjustment system 14 comprises a reflective assembly 44 and an actuator 46. The reflective assembly 44 may comprise deformable plate 50, at least one coupler 52, a first anchor 54, and a second anchor 56.

The deformable plate 50 may be a planar sheet of material having any suitable thickness, having a first major side 60 (hereafter referred to as a 'rear side') and a second major side 62 (hereafter referred to as a 'reflective side'). In some examples, plate 50 may be composed of metal or any suitable plastic (e.g., such as polyethylene terephthalate (PET) or acrylic), wherein reflective side 62 may comprise a material having reflectance properties that are 95% or greater (as is common in precision optical devices). In at least one example (optional) shown in FIG. 3A, reflective side 62 may comprise a film 63 adhered to the planar sheet (e.g., film 63 comprising a thin layer of silver, aluminum, or other suitable material). Material of plate 50 may be suitable for flexing the plate 50 between a nominal position (e.g., having a planar profile) and a deployed position (e.g., a curved or other non-planar profile). As described more below, according to one example, a radius of curvature in the deployed position may correspond with a desired beam distribution. Plate 50 may or may not be resilient—e.g., the material properties of the plate 50 may cause the plate 50 to return to the nominal position when the plate 50 is not under a load; however, this is not required.

At least one coupler 52 may comprise a band, a beam, a rod, a hook, a clip, or any other suitable element coupled to the actuator 46 and coupled to a middle region 64 of the rear side 60 of plate 50. In the illustrations, coupler 52 is illustrated as a rod that is coupled to the plate 50 extending between a first end 68 of the plate 50 and a second (opposite) end 70 thereof; however, this is merely an example. Other implementations exist wherein the coupler 52 could be attached to the plate 50 in other ways or locations. Further, in some examples, multiple couplers 52 could be used—spaced from one another—so that, in the deployed position, the geometry of the plate 50 is not a curved plane, but a more complex curve (e.g., a concave elliptic paraboloid, a convex elliptic paraboloid, a hyperbolic paraboloid, etc.).

Continuing with the illustrated example, the first and second anchors 54, 56 may be any suitable devices that may be coupled to the plate 50 and that may be designed to not translate when the plate 50 is moved between the nominal and deployed positions. In one example, the anchors 54, 56 may rotate relative to the housing 20 along respective axes $X_{54}$, $X_{56}$; however, this is merely an example and not required. As shown in the exemplary figure, the first and second anchors 54, 56 may be positioned on the plate outboard of the coupler 52. Still further, the first and second anchors 54, 56 may be fixed to the housing 20 or other suitable structure therein.

In the example shown in FIGS. 2 and 3B, actuator 46 comprises a driving member 72 and coupling element 74 extending between driving member 72 and coupler 52; however, this is merely an example. Driving member 72 may be an electric motor or any other suitable device that can move the plate 50 between the nominal and deployed positions. Coupling element 74 may be a wire, a Bowden cable, or the like.

Returning to FIG. 2, the receiver 24 may be any suitable electronic device for detecting a returned depth-data signal. E.g., returned depth-data signals may be reflected off of surfaces of objects in the neighboring environment of the sensor system 10 and captured through the receiving window 42 along an optical path and detected by receiver 24. Accordingly, receiver 24 may be configured to receive light energy (e.g., in LIDAR sensor implementations), radio-wave energy (e.g., in millimeter RADAR sensor implementations), sound energy (e.g., in sonar sensor implementations), or the like. Receiver 24 may be tuned to the depth-data signals emitted by emitter 22; other aspects of receiver 24 will be appreciated by those skilled in the art.

Computer 30, also shown in FIG. 2, may comprise a processor 76 programmed to process and/or execute digital instructions and memory 78. Processor 76 may be any electronic device or circuit programmed and/or otherwise configured: to control the emitter 22 and receiver 24; to control the beam-distribution adjustment system 14; and in some examples, to control the turret 19. Non-limiting examples of processor 76 include a microprocessor, a microcontroller or controller, an application specific integrated circuit (ASIC), a field-programmable gate array (FPGA), one or more electrical circuits comprising discrete digital and/or analog electronic components arranged to perform predetermined tasks or instructions, etc.—just to name a few.

Memory 78 may include any non-transitory computer usable or readable medium, which may include one or more storage devices or articles. Exemplary non-transitory computer usable storage devices include conventional hard disk, solid-state memory, random access memory (RAM), read-only memory (ROM), erasable programmable read-only memory (EPROM), electrically erasable programmable read-only memory (EEPROM), as well as any other volatile or non-volatile media. Non-volatile media include, for example, optical or magnetic disks and other persistent memory, and volatile media, for example, also may include dynamic random-access memory (DRAM). These storage devices are non-limiting examples; e.g., other forms of computer-readable media exist and include magnetic media, compact disc ROM (CD-ROMs), digital video disc (DVDs), other optical media, any suitable memory chip or cartridge, or any other medium from which a computer can read.

Memory 78 may store one or more computer program products which may be embodied as software, firmware, or other programming instructions executable by the processor 76. Additional non-limiting examples of instructions may include, to: receive from autonomous navigation system 16 a command to actuate sensor system 10; based on the command, rotate the sensor system 10 via turret 19; based on the command, emit depth-data signals and receive returned depth-data signals from object reflections; selectively move the beam-distribution adjustment system 14 between the nominal and deployed positions; and move the beam-distribution adjustment system 14 between the nominal and deployed positions at a predetermined frequency. These instructions are merely examples which may or may not be used in any suitable combination with one another. Also, other instructions may be stored and executed by computer 30 as well, as described more below.

Figure 4:
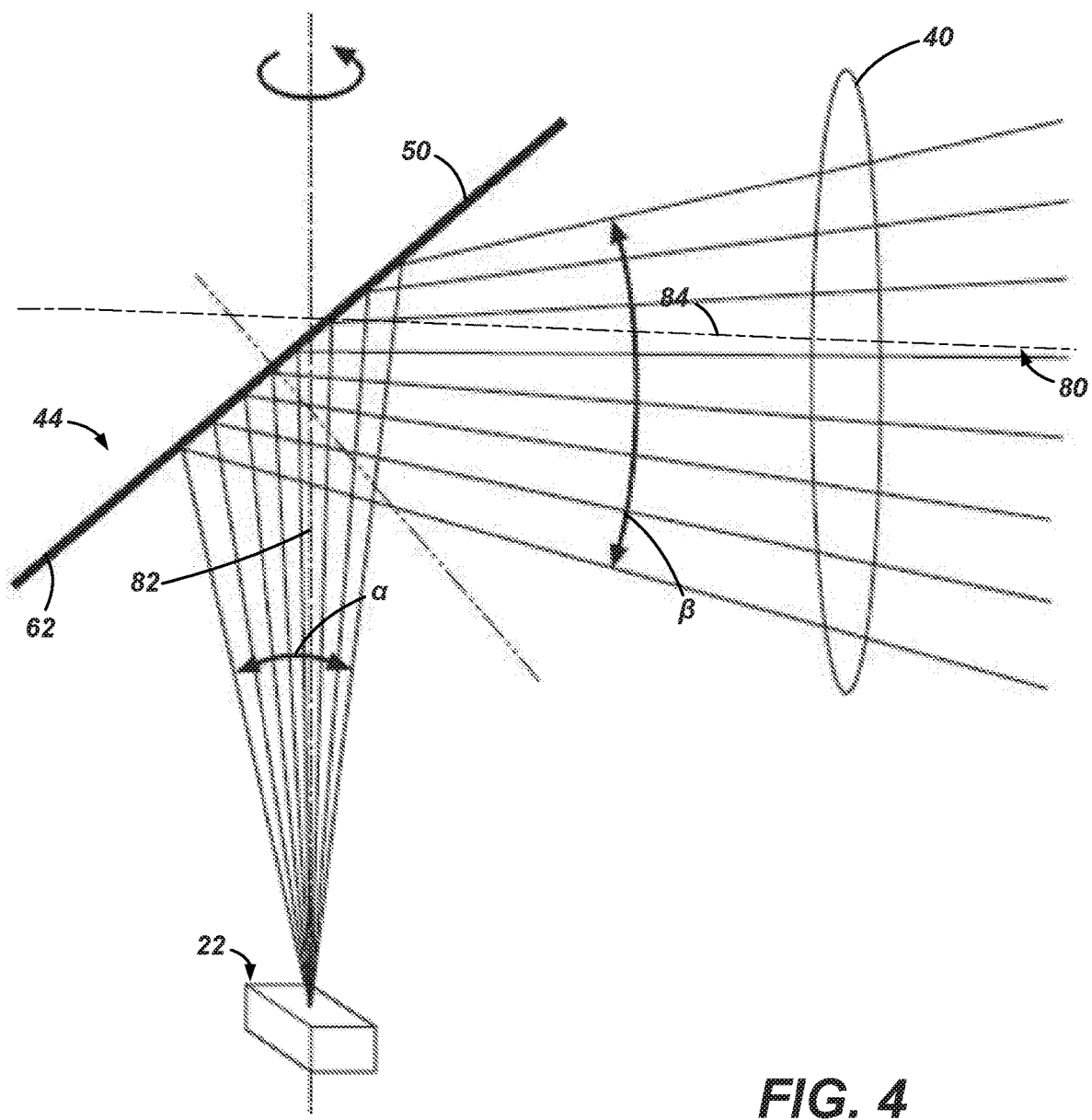
FIG. 4 is a schematic view of a first beam distribution using the beam-distribution adjustment system shown in FIG. 2 (in a nominal position).
Figure 5:
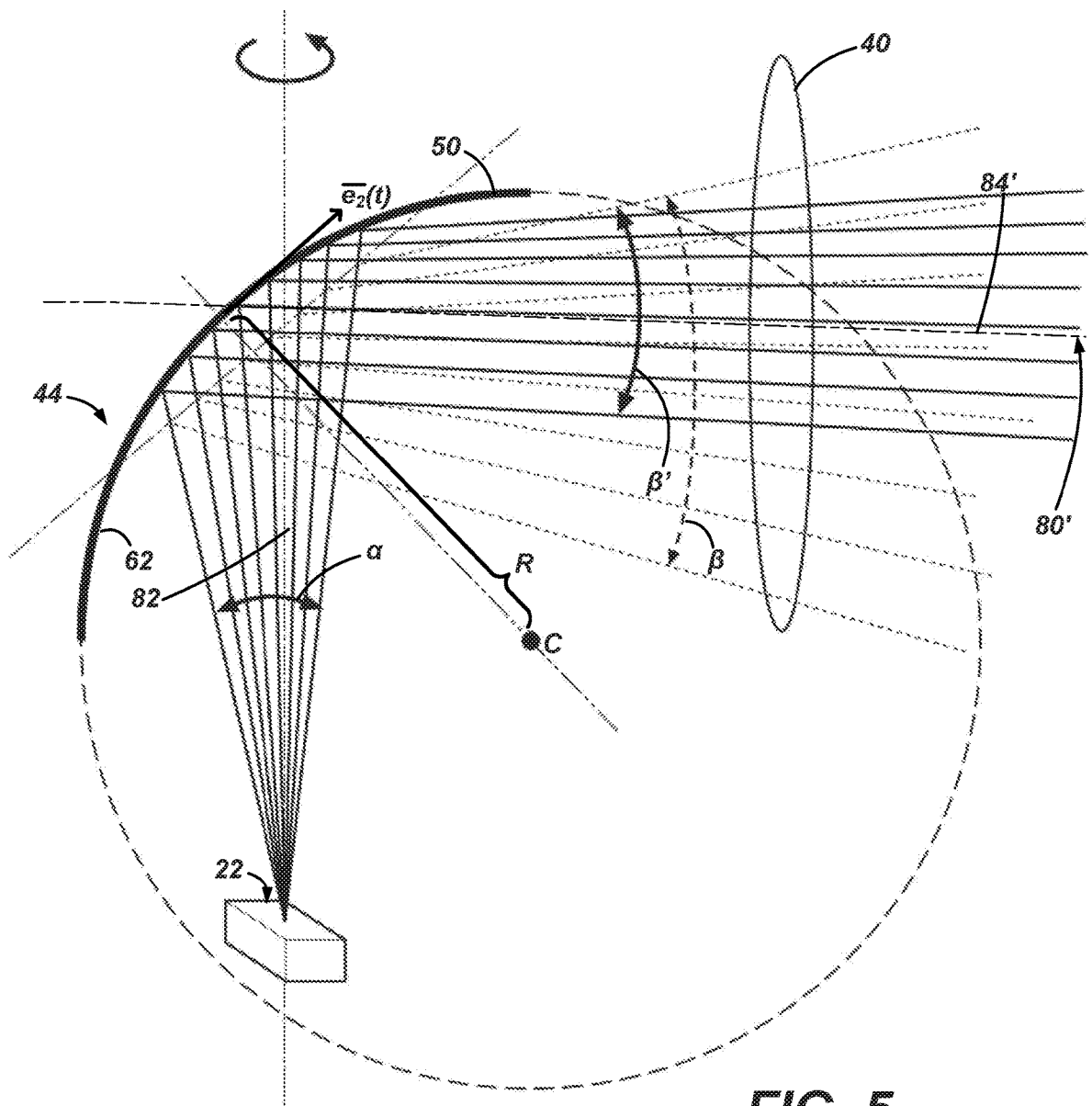
FIG. 5 is a schematic view of a second beam distribution using the beam-distribution adjustment system shown in FIG. 2 (in a deployed position).

Turning to FIGS. 4 and 5, FIG. 4 illustrates the emitter 22 and the reflective assembly 44 (in the nominal position), and FIG. 5 illustrates the emitter 22 and the reflective assembly 44 (in one of a plurality of deployed positions). Each of the diagrams are shown by way of example (with some elements of the sensor system 10 hidden from view).

With regard to FIG. 4, an optical path 80 is illustrated that comprises a first axis 82 and a second (e.g., reflected) axis 84. Light from emitter 22 directed toward the reflective side 62 of assembly 44 may have an angular distribution relative to first axis 82. This angular distribution may continue along second axis 84 following a reflection from side 62 (continuing through window 40). Along first axis 82, an angular distribution α is illustrated, and along second axis 84, an angular distribution β is illustrated. In FIG. 4, an angular measure of angular distribution α may equal an angular measure of angular distribution β. In at least some examples, when the turret 19 (not shown in FIG. 4) rotates the sensor system 10 about axis A, concurrent rotation of emitter 22 and reflective assembly 44 occurs, wherein first axis 82 coincides with axis A.

Figure 6:
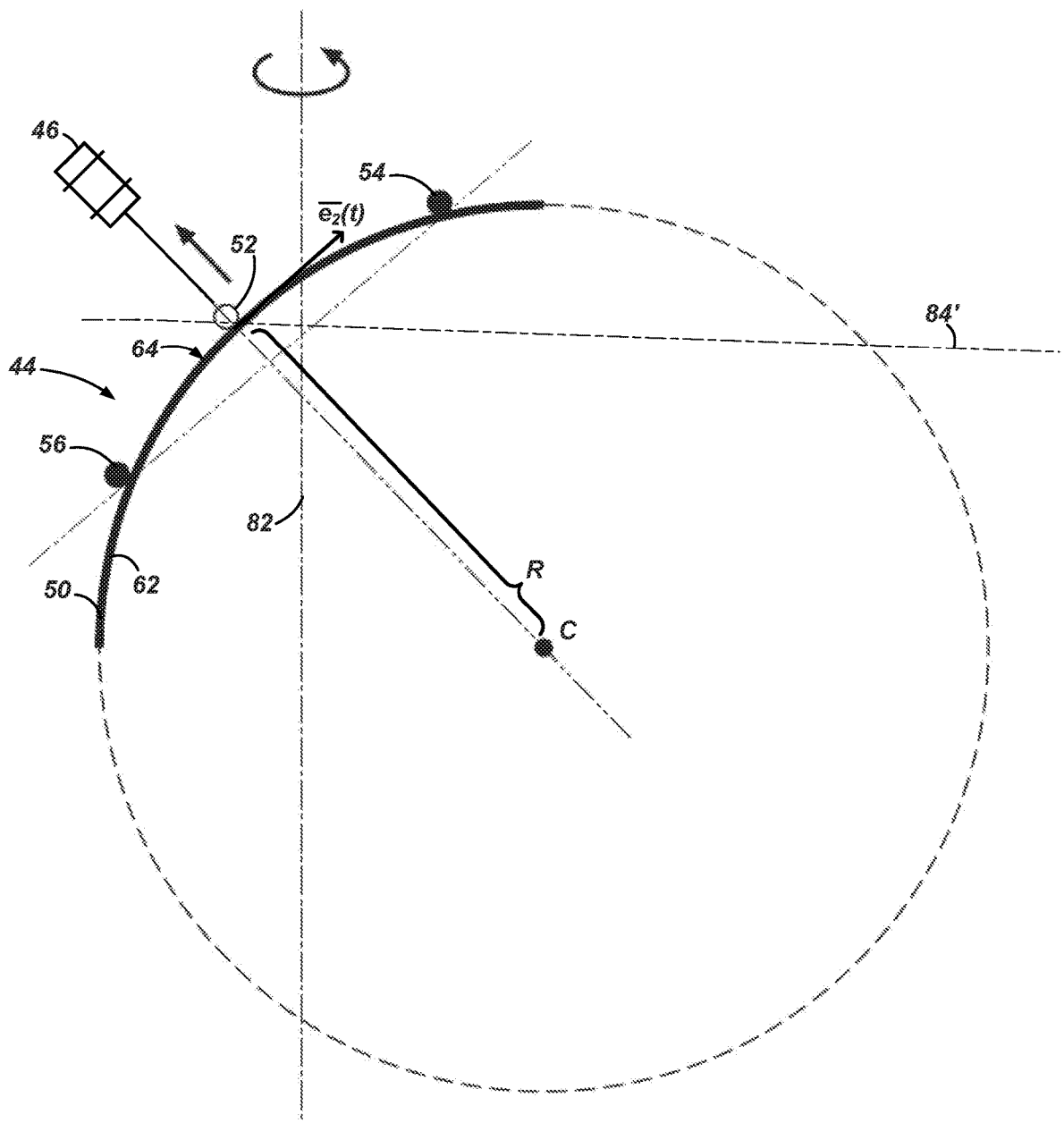
FIG. 6 is a schematic view of the beam-distribution adjustment system shown in the deployed position, wherein the beam distributions are hidden.

Turning to FIG. 5, an optical path 80' is illustrated that comprises the first axis 82 and a second (e.g., reflected) axis 84'; second axis 84 (FIG. 4) may differ from second axis 84' (FIG. 5) as the reflective assembly 44 is in a deployed position. In the example shown in FIGS. 5-6, actuator 46 applies a force (or load) to coupler 52 displacing the middle region 64 (of plate 50) relative to the first and second anchors 54, 56. In at least one example (when the beam-distribution adjustment system 14 moves between the nominal and deployed positions), anchors 54, 56 experience no translational movement; i.e., their position in three-dimensional space remains fixed (e.g., relative to housing 20). In at least one example, anchors 54, 56 (or a component thereof) may rotate or pivot (e.g., accounting for the change in position of plate 50 relative to the anchors 54, 56). In one non-limiting example, the shape of the plate 50 may be a space curve (i.e., a three-dimensional curve), wherein a radius R of curvature (measured from a center C to plate 50 in the deployed position) is a length of a curvature vector ($\overline{e_2}(t)$) (e.g., determinable using differential geometry techniques). Accordingly, as shown in FIG. 5, the change in shape of assembly 44 causes a change in the beam distribution emitted through window 40.

As similarly described above (with respect to FIG. 4), light from emitter 22 shown in FIG. 5 may be directed toward the reflective side 62 of assembly 44, and this light may have a first angular distribution relative to first axis 82. However, in the illustrated deployed position, the light may have a second, different angular distribution along second axis 84' following a reflection from side 62 (continuing through window 40) than it did when plate 50 was generally flat. In the example, the concave characteristics of the reflective assembly causes the beam to narrow. Thus, while the first angular distribution α may be identical to that shown in FIG. 4, the second angular distribution β' in FIG. 5 (which differs from the angular distribution β of FIG. 4) may reflect from side 62. For example, here an angular measure of the angular distribution α may be greater than an angular measure of the angular distribution β'. And continuing with the example of sensor system 10 being a LIDAR sensor, this would mean that emitted light rays may be closer together (more densely spaced from one another) as they travel toward the surfaces of objects in the neighboring environment and correspondingly reflect back toward the system 10. Accordingly, this provides more information regarding at least some of the regions of interest around vehicle 12. For reference purposes, angular distributions β and β' can be measured relative to window 40.

Figure 7:
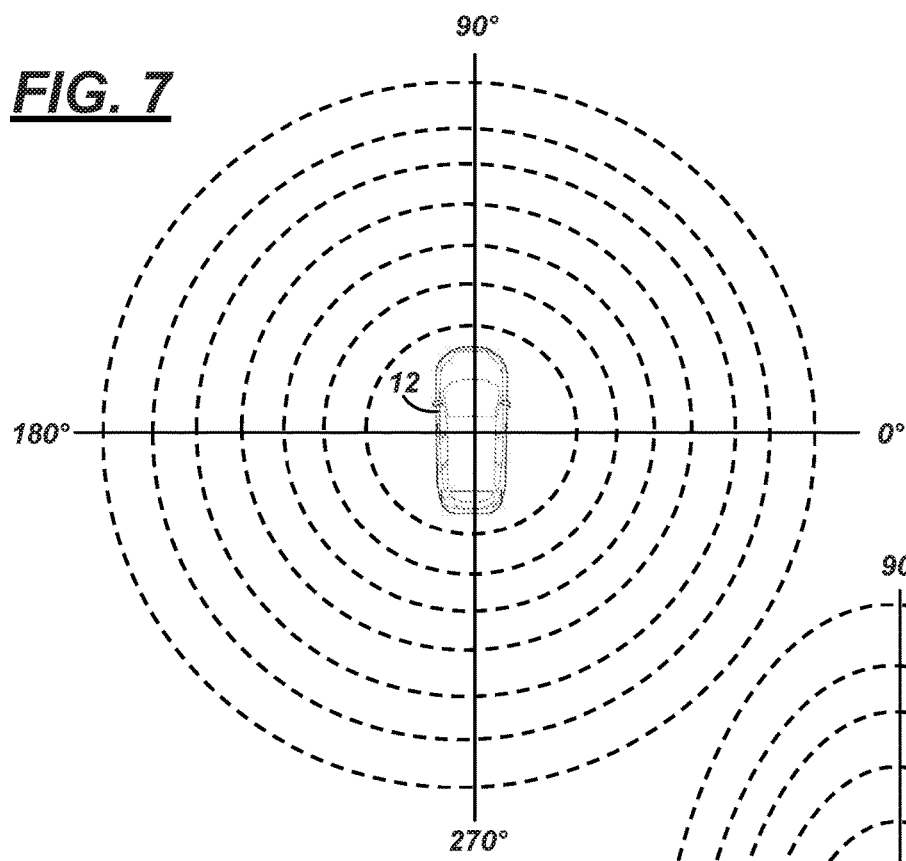
FIG. 7 illustrates a top view of the vehicle shown in FIG. 1 and a uniform beam distribution (around the vehicle) that corresponds with the beam-distribution adjustment system being in the nominal position.
Figure 8:
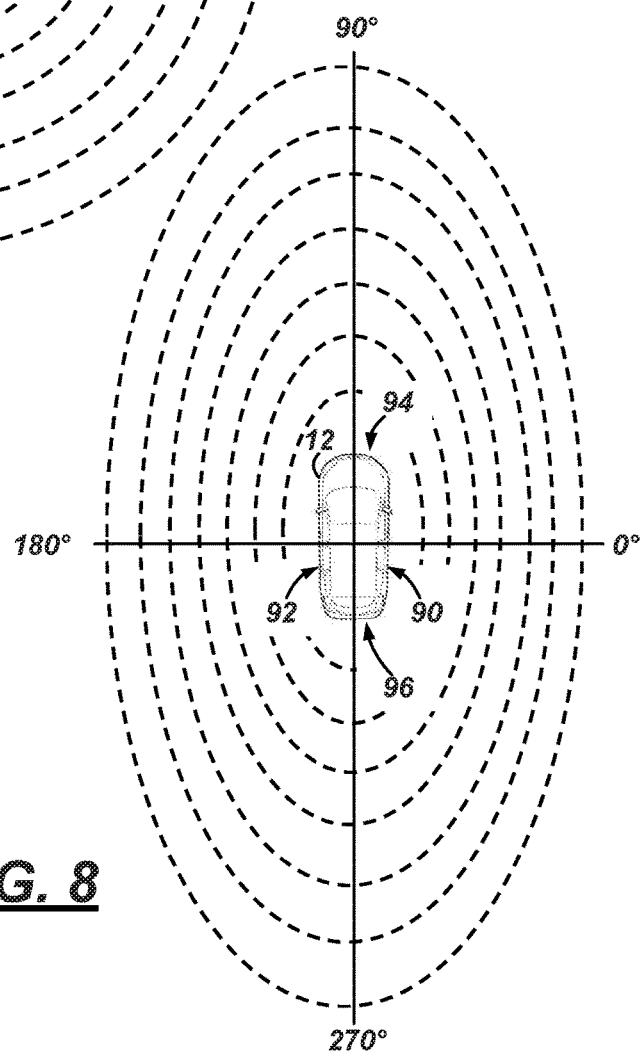
FIG. 8 illustrates a top view of the vehicle shown in FIG. 1 and an uneven beam distribution (around the vehicle) that corresponds with the beam-distribution adjustment system being in the deployed position.

FIGS. 7 and 8 illustrate examples of the sensor system 10 in the nominal and deployed positions, respectively. For example, in FIG. 7, a relatively even distribution of light rays may be emitted from sensor assembly 12 (e.g., throughout a 360° FOR). And in FIG. 8, an uneven distribution of light rays may be emitted from sensor assembly 12 (e.g., throughout a 360° FOR). For instance, in the example of FIG. 8, as the sensor system 10 rotates, the computer 30 may control the beam-distribution adjustment system 14 to move from a deployed position (e.g., having a predetermined radius of curvature R) at 0° to a nominal position at 90° to the deployed position (radius of curvature R) at 180° to the nominal position at 270° and to the deployed position again (radius of curvature R) at 0°, wherein the process repeats. A full cycle (also referred to a 360° rotation) may be completed at regular intervals—e.g., non-limiting examples of cycle rates being between 3-20 Hertz (as will be appreciated by those skilled in the art, this cycle rate also may be the corresponding refresh rate of the sensor system).

FIG. 9 illustrates a process 900 of operating the sensor system 10—e.g., executable by processor 76 of computer 30 using instructions stored in memory 78. As discussed above, the sensor system computer 30 may control various aspects of the sensor system 10 so that vehicle 12 may receive situational awareness information regarding its surroundings, and in some examples, this data may be used by the autonomous navigation system 16 to at least partially navigate the vehicle 12. Process 900 may begin with block 910, wherein the sensor system 10 is powered to an ON state. This may occur at a time of vehicle ignition or start (or otherwise).

Following block 910, and according to one example, the sensor system 10 (e.g., when embodied as a LIDAR sensor) may emit depth-data signals in the form of light from emitter 22 in the nominal position and receive returned depth-data signals via the receiver 24 (block 920). Of course, in other examples, the depth-data signals could comprise other types of signals (e.g., radio waves, sound waves, etc.).

In block 930 which follows, computer 30 may receive a command from the autonomous navigation system 16 to collect more information pertaining to one or more specified regions of interest (ROIs) around the vehicle 12 (e.g., more than what is provided nominally; e.g., more than an even distribution). For instance, using FIG. 8 as an example, autonomous navigation system 16 may request more information regarding objects on one or more sides of vehicle 12.

In one example, system 16 may request information regarding objects on a starboard side 90 of vehicle 12 and a port side 92 of vehicle 12. (Of course, in other examples, computer 30 may receive a command regarding collecting additional information on any combination of the starboard side 90, the port side 92, a fore side 94, and/or an aft side 96).

Returning to FIG. 9, in block 940 which follows, in response to receiving the command from the autonomous navigation system 16, computer 30 may determine a deployment profile of the reflection assembly 44. Block 940 may include knowing or identifying a rotational position of the sensor system 10 relative to an orientation of the vehicle 12 (e.g., using an optical encoder, Hall sensor(s), a resolver, or the like). This typically is based on a predetermined frame of reference stored in memory 78. Thus, determining the deployment profile in block 940 may include: (block 942) identifying at least one angular region of interest (ROI) wherein the reflective assembly 44 is to be in a deployed position; (block 944) determining a turret rotation frequency; (block 946) determining a synchronization of the moving of the reflective assembly 44 between the nominal and deployed positions—based on turret rotation frequency; and (block 948) controlling the actuator 46 to synchronously move the reflective assembly 44 between the nominal and deployed positions according to the determined deployment profile.

To illustrate one example of block 940 (e.g., sub-blocks 942-948), block 942 may comprise identifying a first ROI, relative to vehicle 12, of 315° to 45° and a second ROI, relative to vehicle 12, of 135° to 225°. This approximates the example shown in FIG. 8—e.g., the starboard side 90 (first ROI) and port side 92 (second ROI). Block 944 may include computer 30 measuring this rotational frequency or receiving it from ANS 16. Block 946 (determining a deployment profile) may include determining that the first ROI is ¼ of a rotation and the second ROI is ¼ of a rotation and determining to initiate movement of the reflective assembly 44 from the nominal position to the deployed position when the sensor system position corresponds with 315° (according to its frame of reference), to move the reflective assembly 44 from the deployed position to the nominal position when the sensor system position corresponds with 45°, to move the reflective assembly 44 from the nominal position to the deployed position when the sensor system position corresponds with 135°, to move the reflective assembly 44 from the deployed position to the nominal position when the sensor system position corresponds with 225°, and to repeat. And block 948 may comprise computer 30 controlling movement of the reflective assembly 44, via the actuator 46, according to the determined deployment profile.

It should be appreciated that sensor system 10 may continue to emit depth-data signals and receive returned depth-data signals concurrent with the execution of blocks 930 and 940. Following block 940, computer 30 may determine (in block 950) whether the power state has changed to OFF. If it has, the process may end; otherwise, process 900 may proceed to block 960.

In block 960, computer 30 may determine whether the turret rotational frequency has changed or whether a different deployment profile has been requested. In the context of this disclosure, the deployment profile is intended to be construed to include zero, one, or multiple regions of interest (e.g., zero ROIs meaning the reflective assembly 44 remains in the nominal position for multiple rotations of the sensor system 10). When the turret rotational frequency and/or the requested ROI(s) have changed, then process 900 may loop back and repeat block 940 (or at least a portion thereof). When neither the turret rotational frequency and/or the ROI(s) have changed, then process 900 may loop back and repeat block 950 (e.g., continuing to emit depth-data signals and receive returned depth-data signals).

Other examples of beam-distribution adjustment systems also exist. For instance, beam-distribution adjustment system 14 could be deployed so that the reflective assembly 44 has a convex characteristic instead of a concave characteristic (e.g., further spreading the light in the deployed position, rather than concentrating it). In this case, the actuator 46 may drive the plate 50 toward the window 40 giving its shape convex characteristics.

Still other examples exist, as shown in FIGS. 10A, 10B, and 11-12. And in at least one example, some of the features of a depth-data sensor system 10' are identical to those described above regarding sensor system 10; therefore, these will not be re-described.

Figure 10A:
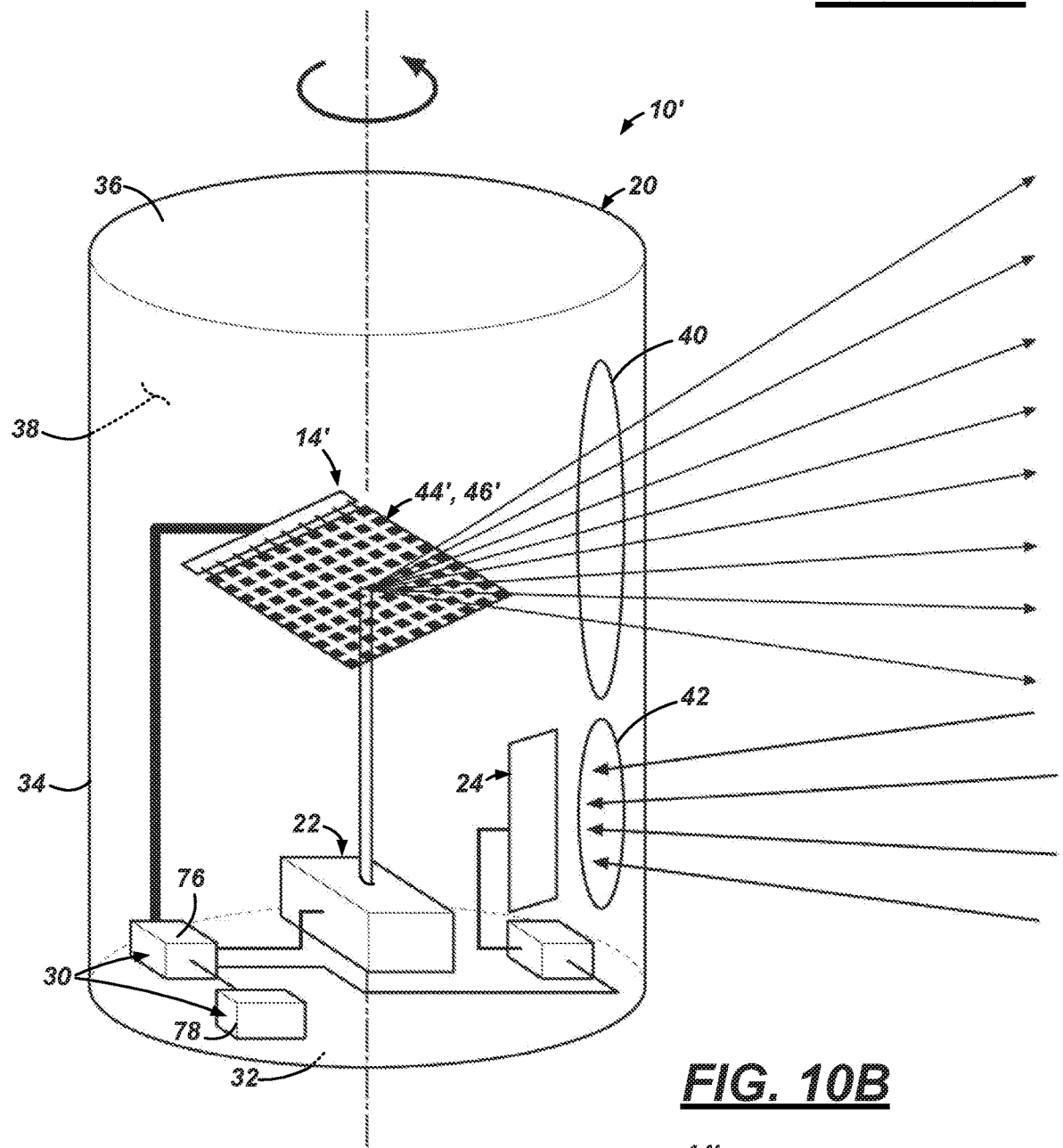
FIG. 10A is a schematic diagram of a second example of the depth-data sensor system.
Figure 10B:
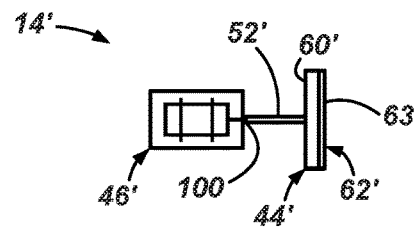
FIG. 10B is a schematic diagram of another example of a reflective assembly and an actuator.

FIGS. 10A-10B illustrate sensor system 10' comprising another example of a beam-distribution adjustment system 14'. In this example, an array of reflective assemblies 44' are shown which (in one example) each have a dedicated actuator 46' (e.g., a plurality of assemblies 44' and a plurality of corresponding actuators 46'). The array may be any suitable size (e.g., a 10×10 array is shown; however, this is merely an example). In one example, each of the reflective assemblies 44' may be identical; and in one example, each of the actuators 46' may be identical. Therefore, only one of each will be described.

According to a non-limiting example, reflective assembly 44' is a miniature mirror or other reflective element having a first major side 60' (rear side) and a second major side 62' (reflective side). As previously described, reflective side 62' may or may not comprise film 63. Actuator 46' may be similar to that described above; and in at least one example, actuator 46' is a miniature electric motor which is coupled to reflective assembly 44' via at least one coupler 52'. According to at least one example, actuator 46' can be moved to pivotably steer assembly 44' through a range of angular motions via a pivot connection 100—e.g., thereby being adapted to redirect light emitted from emitter 22 according to any suitable predetermined deployment profile.

Figure 11:
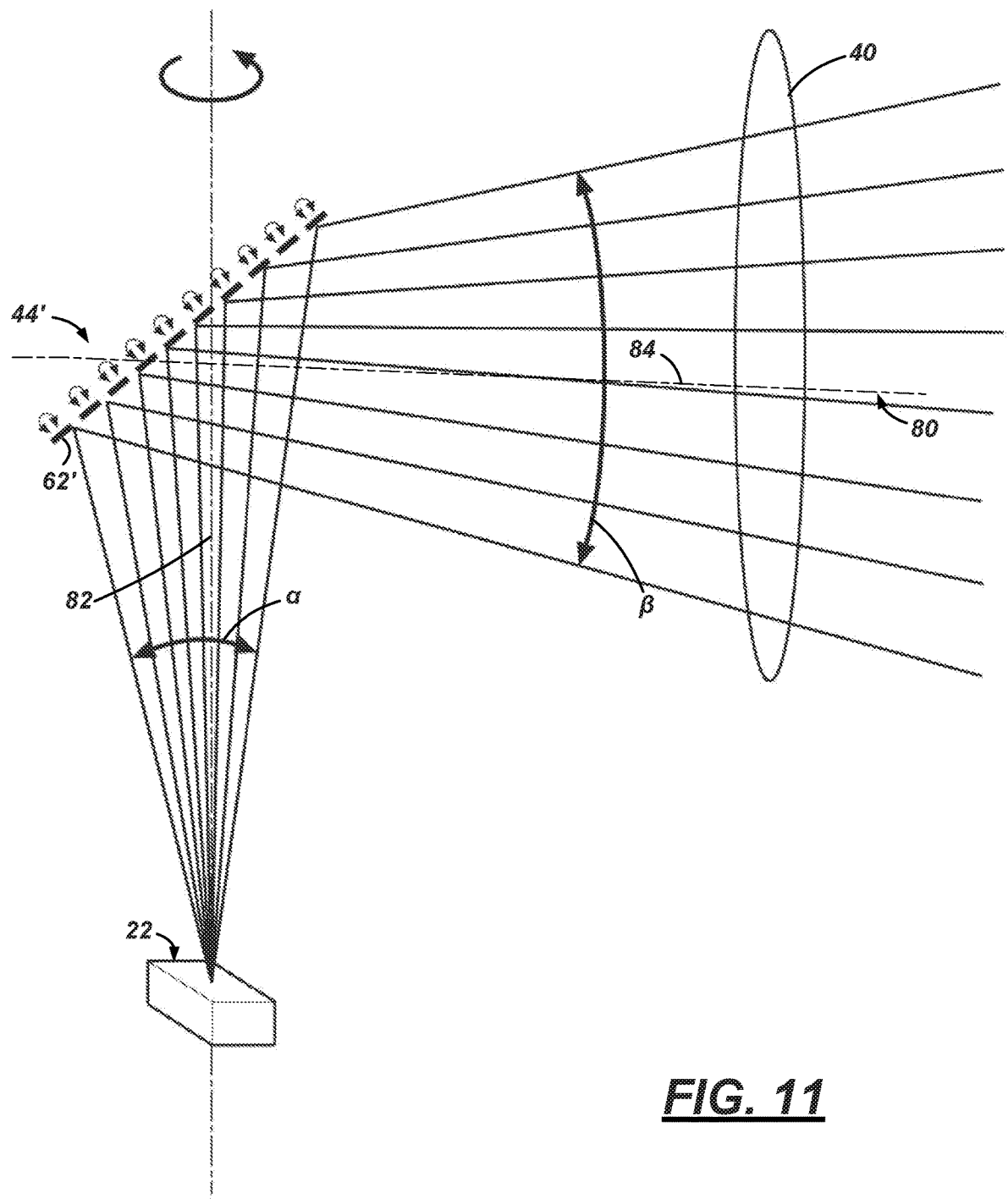
FIG. 11 is a schematic view of a first beam distribution using the second example of the beam-distribution adjustment system shown in FIG. 10 (in a nominal position).
Figure 12:
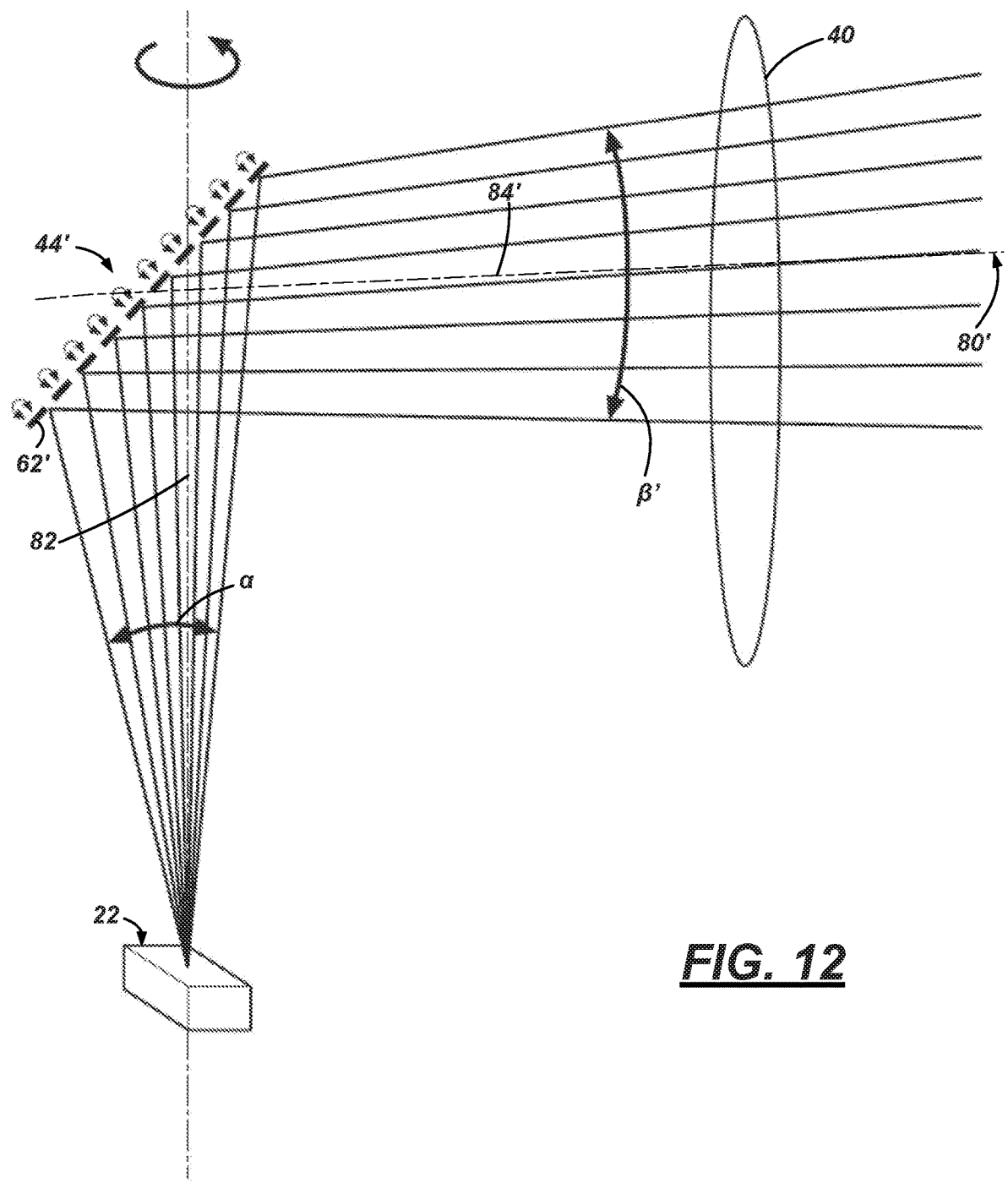
FIG. 12 is a schematic view of a second beam distribution using the second example of the beam-distribution adjustment system shown in FIG. 10 (in a deployed position).

In at least one example, each of the actuators 46' are independently controlled (e.g., selective control of actuators 46' throughout the array thereof). In this manner, the sensor system 10' may be controlled using a process similar to that described in FIG. 9 to move between a nominal position (all reflective assemblies 44' in a nominal position) and an at least partially deployed position (e.g., wherein at least some of the reflective assemblies 44' are not in the nominal position). Accordingly, beam-distribution adjustment system 14' may generate a deployment profile similar to that of system 14, or system 14' may generate a deployment beam profile having different concentrations (e.g., of its cross-sectional area)—e.g., one or more higher density regions and/or one or more higher density regions of varying shapes. In general, FIG. 11 illustrates adjustment system 14' in the nominal position (e.g., similar to FIG. 4), and FIG. 12 illustrates an example of the adjustment system 14' in a deployed position (e.g., similar to FIG. 5).

The above-described sensor system may be used in a variety of vehicle mobility scenarios. For example, when vehicle 12 is proceeding through a roadway intersection, it may be desirable to receive additional information regarding the neighboring environment on the starboard side 90 and/or port side 92 of vehicle 12. Similarly, on a higher-speed highway, it may be desirable to receive more detailed information on the fore side 94 (and/or aft side 96) of vehicle 12. Or while traveling at night or near dusk, it may be desirable to gather additional information between the starboard and fore sides 90, 94 and/or between the port and fore sides 92, 94—e.g., to watch for deer or other animals that may attempt to cross the roadway. These are merely a few examples wherein the driver and/or the ANS 16 may desire additional information regarding vehicle surroundings.

Thus, there has been described a depth-data sensor system comprising a beam-distribution adjustment system that changes a beam profile between a nominal position and deployed position. In some examples, this system may be mounted on a vehicle; in other instances, this system could be attached to infrastructure or the like. Changing the beam profile may include increasing an angular distribution of a plurality of depth-data signals, decreasing an angular distribution of the plurality of depth-data signals, generating some regions of higher beam density, and/or generating some regions of lower beam density.

In general, the computing systems and/or devices described may employ any of a number of computer operating systems, including, but by no means limited to, versions and/or varieties of the Ford SYNC® application, AppLink/Smart Device Link middleware, the Microsoft® Automotive operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above and is accessed via a network in any one or more of a variety of manners. A file system may be accessible from a computer operating system and may include files stored in various formats. An RDBMS generally employs the Structured Query Language (SQL) in addition to a language for creating, storing, editing, and executing stored procedures.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor may be programmed to process the sensor data. Processing the data may include processing the video feed or other data stream captured by the sensors to determine the roadway lane of the host vehicle and the presence of any target vehicles. The processor instructs vehicle components to actuate in accordance with the sensor data. The processor may be incorporated into a controller, e.g., an autonomous mode controller.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A sensor system, comprising:
a housing;
an emitter, carried by the housing, that emits a beam comprising depth-data signals;
a beam-distribution adjustment system comprising a plurality of reflective assemblies and a plurality of actuators; and
a processor programmed to control the beam-distribution adjustment system by selectively changing an angular distribution of the depth-data signals emitted from the housing;
wherein a different one of the plurality of actuators is coupled to each of the plurality of reflective assemblies;
at least one of the plurality of reflective assemblies is positioned in the housing in an optical path of the depth-data signals emitted from the emitter;
when the processor controls the beam-distribution adjustment system from a nominal position to at least one deployed position, at least some of the plurality of actuators control a pivotal movement of the corresponding plurality of reflective assemblies; and
an angular extent of the angular distribution of the depth-data signals emitted from the housing has a different value when the beam-distribution adjustment system is in the nominal position than when the beam-distribution adjustment system is in the at least one deployed position.

2. The sensor system of claim 1, wherein the processor selectively moves the beam-distribution adjustment system between the nominal position and the at least one deployed position.

3. The sensor system of claim 1, wherein the sensor system is one of a light detection and ranging (LIDAR) sensor, a radio detection and ranging (RADAR) sensor, or a sonar sensor.

4. The sensor system of claim 1, wherein each of the plurality of reflective assemblies is coupled to the different one of the plurality of actuators via a respective coupler that facilitates independent pivotal motion of the each of the plurality of reflective assemblies relative to the respective different one of the plurality of actuators.

5. The sensor system of claim 1, wherein, when the processor controls the beam-distribution adjustment system from the nominal position to the at least one deployed position, it controls the angular distribution of the beam.

6. The sensor system of claim 1, wherein, when the processor controls the beam-distribution adjustment system from the nominal position to the at least one deployed position, it controls a concentration of the depth-data signals of the beam.

7. The sensor system of claim 1, further comprising a turret which rotates the sensor system, wherein the processor is programmed to control the actuators to move the reflective assemblies between the nominal position and the at least one deployed position at a predetermined frequency.

8. A system for a vehicle, comprising an autonomous navigation system (ANS) and the sensor system of claim 1, wherein the ANS commands the sensor system to provide more information regarding a region of interest around the vehicle.

9. The system of claim 8, wherein the region of interest is a fore side of the vehicle, an aft side of the vehicle, a starboard side of the vehicle, a port side of the vehicle, or a combination thereof.

10. A method, comprising:
emitting a beam that comprises depth-data signals from a housing of a sensor system that comprises a beam-distribution adjustment system; and
controlling the beam-distribution adjustment system to control an angular distribution of the depth-data signals emitted from the housing;
wherein the beam-distribution adjustment system comprises a plurality of reflective assemblies and a plurality of actuators;
a different one of the plurality of actuators is coupled to each of the plurality of reflective assemblies;
at least one of the plurality of reflective assemblies is positioned in the housing in an optical path of the depth-data signals emitted from the emitter;
when the processor controls the beam-distribution adjustment system from a nominal position to at least one deployed position, at least some of the plurality of actuators control a pivotal movement of the corresponding plurality of reflective assemblies; and
an angular extent of the angular distribution of the depth-data signals emitted from the housing has a different value when the beam-distribution adjustment system is in the nominal position than when the beam-distribution adjustment system is in the at least one deployed position.

11. The method of claim 10, wherein controlling the beam-distribution adjustment system includes selectively changing the angular distribution of the depth-data signals by controlling the beam-distribution adjustment system between the nominal position and the at least one deployed position.

12. The method of claim 10, wherein controlling the beam-distribution adjustment system includes steering at least some of the plurality of reflective assemblies.

13. A sensor system, comprising:
a housing;
an emitter, carried by the housing, that emits a beam comprising depth-data signals;
a beam-distribution adjustment system comprising a reflective assembly and an actuator;
a processor programmed to control the beam-distribution adjustment system by selectively changing an angular distribution of the depth-data signals emitted from the housing; and
a turret which rotates the sensor system;
wherein the processor is programmed to control the actuator to move the reflective assembly between a nominal position and a deployed position at a predetermined frequency; and
the predetermined frequency is based on a rotation frequency of the turret.

14. The sensor system of claim 13, wherein an angular extent of the angular distribution of the depth-data signals emitted from the housing has a different value when the beam-distribution adjustment system is in the nominal position than when the beam-distribution adjustment system is in the at least one deployed position.

* * * * *